(12) United States Patent
Sanderson et al.

(10) Patent No.: US 7,337,709 B2
(45) Date of Patent: Mar. 4, 2008

(54) PRESERVATIVE GAS GENERATING DEVICE

(75) Inventors: Ronald Douglas Sanderson, Stellenbosch (ZA); Willem Jacobus Opperman, Stellenbosch (ZA)

(73) Assignees: Universaity of Stellenbosch, Stellenbosch (ZA); Deciduous Fruit Producers Trust, Paarl (ZA)

(*) Notice: Subject to any disclaimer, the term of this patent is extended or adjusted under 35 U.S.C. 154(b) by 597 days.

(21) Appl. No.: 10/479,827

(22) PCT Filed: Jun. 6, 2002

(86) PCT No.: PCT/IB02/02037

§ 371 (c)(1),
(2), (4) Date: Feb. 24, 2004

(87) PCT Pub. No.: WO03/018431

PCT Pub. Date: Mar. 6, 2003

(65) Prior Publication Data

US 2004/0156768 A1     Aug. 12, 2004

(30) Foreign Application Priority Data

Jun. 6, 2001  (ZA) .................................. 01/1851

(51) Int. Cl.
A23L 1/00 (2006.01)

(52) U.S. Cl. .......................... 99/467; 99/485

(58) Field of Classification Search ......... 99/467–476, 99/481, 482, 485; 422/29, 32, 40, 236, 305; 53/432–434; 206/219–222, 205; 426/124, 426/118, 316, 319, 418, 419; 428/74, 76
See application file for complete search history.

(56) References Cited

U.S. PATENT DOCUMENTS 4,061,785 A * 12/1977 Nishino et al. ............. 426/124
5,106,596 A * 4/1992 Clemes ....................... 422/305
5,711,211 A * 1/1998 Ide et al. ..................... 99/467

FOREIGN PATENT DOCUMENTS

| EP | 0 351 636 A | 1/1990 |
| EP | 0 571 228 A | 11/1993 |
| FR | 2 467 795 A | 4/1981 |
| FR | 2 555 552 A | 5/1985 |
| FR | 2 611 669 A | 9/1988 |
| GB | 1 259 100 A | 1/1972 |
| GB | 1 303 330 A | 1/1973 |
| JP | 02 071814 A | 3/1990 |
| JP | 05 304886 A | 11/1993 |

\* cited by examiner

*Primary Examiner*—Timothy F. Simone
(74) *Attorney, Agent, or Firm*—Birch, Stewart, Kolasch & Birch, LLP

(57) ABSTRACT

A preservative gas generating device includes a carrier sheet and a layer of a matrix forming material having a preservative gas generating compound dispersed therein. The layer of matrix forming material permits the generation of a preservative gas by the preservative gas generating compound and to permit the gas to permeate out of the matrix formed by the material. The matrix forming material adheres to the carrier sheet in the form of a layer covering an area of the carrier sheet and forms at least one discrete zone, with a peripheral area of the carrier sheet surrounding the discrete zone(s) being substantially free of the matrix forming material. A cover sheet is secured to said peripheral area to enclose the layer of matrix forming material between the carrier sheet and the cover sheet. At least one of the carrier sheet and the cover sheet are permeable to said preservative gas.

16 Claims, 1 Drawing Sheet

PRESERVATIVE GAS GENERATING DEVICE

FIELD OF THE INVENTION

This invention relates to preservative gas generating devices widely used in the fruit packaging industry in order to preserve the quality of fruit for extended storage and shelf-life periods, the preservative gas generating devices typically being packaged in a plastic bag together with the fruit in a box. The technique is particularly widely used in the packaging and distribution of table grapes.

More particularly, but not exclusively, the invention relates to sulphur dioxide ($SO_2$) gas generating devices of well-known general type wherein a chemical compound which is carried, usually within an envelope or on a sheet of paper or the like, reacts with moisture in the plastic bag to produce sulphur dioxide gas which exhibits the preservative function. One chemical compound widely used for this purpose is sodium metabisulphite.

BACKGROUND TO THE INVENTION

Numerous different types of in-package sulphur dioxide generating devices have been proposed and various of these are in commercial use. Whilst existing sulphur dioxide generating devices are effective to some extent there are deficiencies in at least some respects.

The first general difficulty is to obtain an effective balance between the amount of sulphur dioxide produced; the rate at which it is released; and the length of time during which satisfactory release of sulphur dioxide can be achieved. Many commercially available sulphur dioxide generating devices give off a satisfactory amount of sulphur dioxide gas in the early stages but the $SO_2$ production decreases to an unsatisfactorily low level too soon.

A solution to this problem can be achieved by mixing the chemically active compound with a plastisol or other matrix forming material and curing it with the active compound in particulate or powder form substantially evenly distributed throughout its mass. Generally the plastisol mixture is applied as a layer to a sheet forming a substrate and is covered by another sheet to form a three-layered laminate. Both sheets are pervious to moisture and sulphur dioxide gas. By ensuring adequate but controlled access by moisture in the surroundings to the chemical compound within the plastisol mass (i.e. in the plastic bag in actual use) the quantity of sulphur dioxide produced, and the rate at which it is produced, can be controlled to an advantageous extent.

Control is achieved by selecting the various variables including the thickness of the layer of mixture; the amount of chemical compound mixed with the plastisol; and the means employed for enabling moisture to penetrate the cured plastisol mass at a rate commensurate with the required rate of production of sulphur dioxide over a required period of time. Clearly there also needs to be the facility for enabling sulphur dioxide generated within the cured plastisol mass to migrate from the mass to the atmosphere in the packaging bag in order that it may carry out its preservative action. Such facility will generally be inherently present but it may also require separate consideration.

The means for enabling moisture to penetrate the plastisol mass can be the provision of permeable particles in the mass which substantially touch each other and thus form a path for moisture to enter the mass. Alternatively, or in addition, small gas bubbles can be either generated within the plastisol during the curing process by using a blowing agent or the like, or air may be mixed into the plastisol during the blending of the plastisol and other ingredients together. In the latter case the gas is typically air. A humectant may also be mixed into the plastisol mass in order to attract moisture to the interior thereof. The resultant laminate is then cut up into pieces of a size suitable for inclusion in a package. A composition of this general type forms the basis of South African patent number 96/2517.

However, production of the laminate is difficult to control and, in addition, the cut pieces of laminate may have particles of chemical compound at the cut surface. The latter may have a deleterious effect on fruit which comes into direct contact with such a cut edge. Exposed chemical compound at the cut edges may also be objectionable from a health point of view.

For this reason, the laminate is sometimes placed in a moisture-permeable sleeve which is then included in the fruit package, but this increases the production costs and it is also time consuming to individually insert each laminate into a sleeve.

Accordingly, a need exists to provide an in-package preservative gas generating device which does not exhibit the disadvantages outlined above, at least to the same extent and which can be manufactured in an expeditious manner.

SUMMARY OF THE INVENTION

In accordance with one aspect of this invention there is provided an in package preservative gas generating device comprising a layer of a matrix forming material having a preservative gas generating compound dispersed therein adhered to a carrier sheet in the form of a layer covering a central area of the carrier sheet so as to form at least one discrete zone with the peripheral area of the carrier sheet substantially free of such mixture and a cover sheet secured to said peripheral area to enclose the layer of mixture between the carrier sheet and the cover sheet, the layer of matrix being adapted to permit the generation of a preservative gas under operative conditions by the gas generating compound at a controlled rate and to permit it to permeate out of the matrix, and wherein at least one of the carrier sheet and the cover sheet are permeable to said preservative gas.

Further features of the invention provide for the preservative gas generating compound to be a moisture activated compound in which case the layer of matrix is adapted to permit the ingress of moisture at a controlled rate; for the matrix forming material to be a plastisol; for the plastisol to be formed with a multitude of small gas bubbles entrained therein; for the carrier sheet to have a thermoplastic surface to which the cover sheet is thermally bonded such as, for example, a plastic coating typically of polyethylene carried a support sheet which may be in the form of a more temperature resistant plastics film such as a polyester film or a suitable paper in which case the carrier sheet can be impermeable to both moisture and the preservative gas; and for the cover sheet to be a permeable sheet such as, for example, a non-woven fibrous plastic sheet, typically a non-woven polyester fabric.

In accordance with a second aspect of the invention there is provided a method of manufacturing an in-package preservative gas generating device as defined above including the steps of applying a layer of a matrix forming material having a preservative gas generating compound dispersed therein to an extended carrier sheet with the layer being arranged in discrete zones thereof spaced apart from each other and each of which is surrounded by an area of carrier sheet material devoid of such matrix; treating the matrix as necessary in order to cure it, dry it, or otherwise stabilize it;

covering the extended sheet with a cover sheet; causing the cover sheet to become bonded to the carrier sheet in the areas devoid of said mixture, and subdividing the extended carrier sheet and associated cover sheet to form in package preservative gas generating devices containing one or more of said discrete zones.

Further features of this aspect of the invention provide for the mixture to be as defined herein above; for the mixture to be applied to the carrier sheet by an extrusion process in which a layer of mixture is urged under positive pressure out through a nozzle onto a travelling extended carrier sheet, the nozzle conveniently being of a width approximately equal to the width of the discrete zones and wherein the spacing of the nozzle from the travelling carrier sheet, at least in part, determines the thickness of the layer; for the carrier sheet to have a thermoplastic surface typically formed as a thermoplastic layer bonded to a support sheet which may be in the form of a more temperature resistant plastics film or a suitable paper—for the matrix forming material to be a plastisol in which case curing thereof is effected by heating, and for the preservative gas generating compound to be adapted to form sulphur dioxide on contact with moisture.

The method of the invention is carried out on a substantially continuous basis by extruding a layer of said mixture in discrete zones onto a travelling extended carrier sheet which is then caused to travel past a heating assembly in order to cure the matrix forming material following which thermal bonding of the cover sheet to the carrier sheet is performed along longitudinal and transverse strips between the discrete zones.

In order that the invention may be more fully understood, one embodiment thereof will now be described with reference to the accompanying drawings.

DETAILED DESCRIPTION WITH REFERENCE TO THE DRAWINGS

Figure 1:
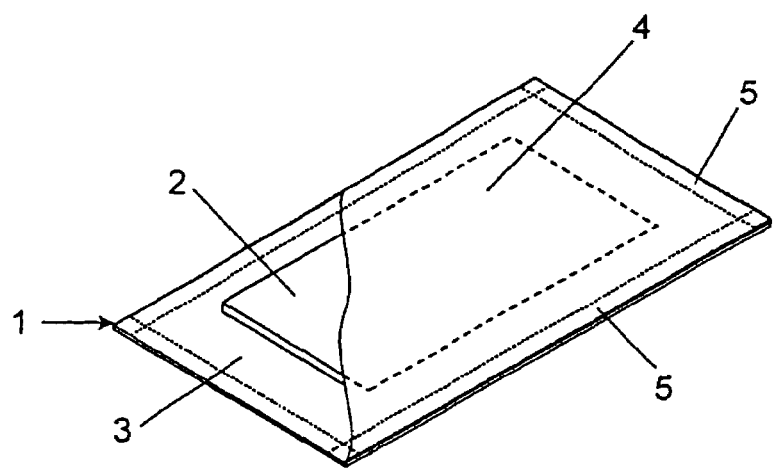
FIG. 1 is a partly broken away isometric view of a single in-package preservative gas generating device according to the invention.

In this embodiment of the invention an in-package sulphur dioxide generating device comprises a carrier sheet (1) which in this particular case is a polyester film having on one surface thereof a layer or film of a thermoplastic material more appropriate to lower temperature thermal welding such as polyethylene, for example. The exact construction of the carrier sheet will depend on requirements. The sheet could, for example, be a co-extruded sheet.

Alternatively, a polyester film may be printed with any one or more of identifying informative and decorative material and thereafter have a film of polyethylene laminated thereto in known manner in the packaging industry. In either event the construction renders the carrier sheet impermeable to both moisture and sulphur dioxide gas. As indicated, the polyethylene layer renders that surface, which is directed operatively inwardly (i.e. upwardly in the illustrated orientation), susceptible to thermal welding.

A substantially rectangular discrete zone (2) of a layer of a matrix forming material, in this case in the form of a PVC plastisol, and a sulphur dioxide generating compound in the form of sodium metabisulphite, is adhered to the carrier sheet such that an endless peripheral area (3) is left devoid of any mixture. This matrix mixture is more fully described below.

A cover sheet (4), in this case made of a non-woven fibrous polyester fabric, covers the discrete zone of cured matrix mixture and is thermally bonded to the polyethylene layer or the carrier sheet around the entire periphery as indicated by numeral (5). The bond is, in this case, more a mechanical bond than a true welded fusion bond. As an alternative to the above fabric, a spun bonded polypropylene or polyethylene fabric could be used as the permeable cover sheet.

In use, the in-package sulphur dioxide generating device can be used in the usual way by installing it on top of the fruit (or vegetables) in a plastic bag, usually in a cardboard box. The generating device is orientated with the cover sheet directed downwards and towards the fruit so that moisture can be received through it to migrate into the matrix to activate the sulphur dioxide generating compound in a controlled manner over a pre-designed period of time. Clearly, there is no wastage of sulphur dioxide gas as the impermeable carrier sheet is directed outwardly and the permeable cover sheet allows the gas generated to pass directly to the fruit. Also, there is little possibility of any part of the layer of mixture coming into contact with the fruit directly or, for that matter, with any part of a person handling the sulphur dioxide generating device or the fruit.

The $SO_2$ gas will generally only be generated at relatively high humidity levels within the package, for example, at humidity levels of between 85 and 100%. The rate at which the $SO_2$ gas is released from the device can be varied according to specific requirements, and generally the rate is either a "constant" release rate or a "sharp peak" release rate. If the device is configured to generate a constant release rate, then the $SO_2$ generally begins to be released within about 12 hours of packaging, and increases until the $SO_2$ concentration within the package is approximately 30 ppm. Thereafter, the $SO_2$ concentration will gradually decrease to between 5 to 15 ppm over a six to eight week period. If, however, the device is configured to produce a "sharp peak" release rate, then the $SO_2$ concentration within the package will rise to about 70 to 80 ppm within 1 to 2 days, and will thereafter decrease to 5 to 10 ppm within a few days, and this lower concentration can be maintained for six to eight weeks.

Turning now to the production of the sulphur dioxide generating device described above, and to the composition of the matrix layer, the exact configuration and matrix mixture will depend on requirements, in particular, the targeted shelf or storage life of the fruit concerned, the nature of the fruit, the cost allowed for the sulphur dioxide generating device, and any other considerations.

Simply by way of example of a plastisol which has proved to be successful in the packaging of grapes the following is given as a preferred formula:

| | |
|---|---|
| PVC powder having a K value of 80: | 58.0% |
| Epoxidized soya bean oil (ESBO) Plasticizer (available in South Africa from Chemserve Ltd) | 40.0% |
| Stablizer in the form of Zinc Stearate in ESBO as carrier (available from Chemserve Ltd) | 1.0% |
| Blowing Agent being Tracel DB145 NER (an azodicarbonamid mixture from Tramanco of Pinneburg Germany) | 1.0% |

To this was added sodium metabisulphite particles having a particle size of <100 μm in an amount of 0.2 kg (variable from 0.1 to 0.3 kg according to the particular application) per kg of the above plastisol mixture. The matrix mixture was blended under a vacuum in a blender.

Figure 2:
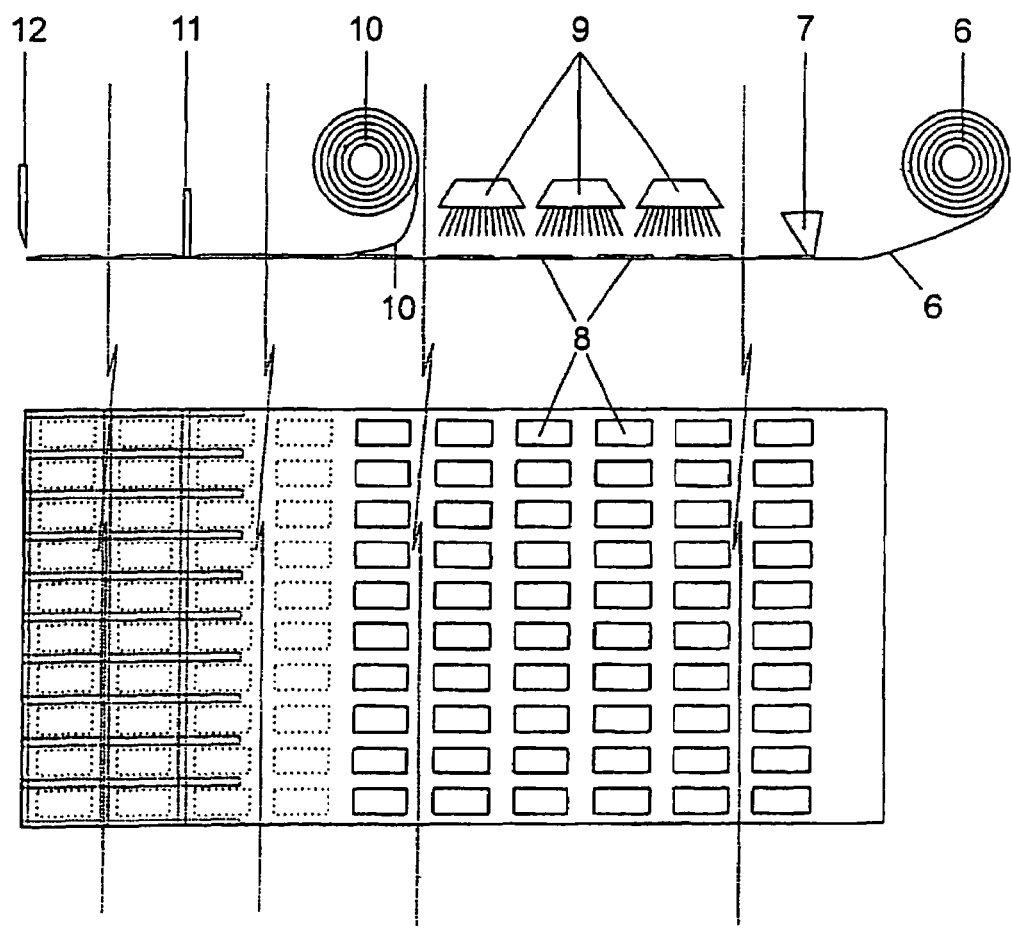
FIG. 2 is a schematic illustration of the process whereby the gas generating device illustrated in FIG. 1 is produced.

The in-package sulphur dioxide generating devices described above are preferably made on a substantially continuous basis using an extended carrier sheet in roll form as indicated by numeral (6) in FIG. 2, the carrier sheet being transported on a support system through a series of items of processing equipment.

The first of these is an extrusion device (7) which is adapted to extrude matrix mixture through a series of nozzles in the form of slots extending across the width of the device. The extruded layer of matrix is discontinuous so that rectangular discrete zones (8) of the matrix are deposited on the travelling carrier sheet.

The sheet is then caused to pass under a series of infrared heaters (9) in order to cure the plastisol.

Thereafter, cover sheet material from a roll (10) thereof is applied over the carrier sheet with the discrete zones of cured matrix mixture thereon.

A welding station (11) causes the cover sheet to become thermally bonded to the plasticized surface of the carrier sheet along transverse and longitudinal strips.

The final station (12) is a cutting and slitting station which subdivides the substantially continuous web of interconnected sulphur dioxide generating devices as described above into the required sizes.

It will be understood that numerous variations may be made to the embodiment of the invention described above without departing from the scope hereof. In particular, the formula employed for making the matrix can be varied widely as can the method of producing the in-package preservative gas generating devices. Also, the invention is not to be interpreted as being limited to sulphur dioxide as the preservative gas and any other preservative gas capable of in situ generation could be used.

The invention claimed is:

1. A preservative gas generating device comprising:
    a carrier sheet;
    a layer of a matrix forming plastic polymer material having a preservative gas generating compound dispersed therein, the layer of matrix forming material being adapted to permit generation of a preservative gas under operative conditions when moisture is present by the preservative gas generating compound at a controlled rate and to permit the gas to permeate out of the matrix formed by the matrix forming material, the matrix forming material being adhered to the carrier sheet in the form of a layer covering an area of the carrier sheet so as to form at least one discrete zone with a peripheral area of the carrier sheet surrounding the discrete zone(s) being substantially free of the matrix forming material; and
    a cover sheet secured to said peripheral area to enclose the layer of matrix forming material between the carrier sheet and the cover sheet;
    wherein either one of the carrier sheet and the cover sheet is permeable to the said preservative gas and the other sheet is impermeable to the preservative gas.

2. A gas generating device according to claim 1, wherein the preservative gas is sulfur dioxide.

3. A gas generating device according to claim 1, wherein the matrix forming material is a plastisol.

4. A gas generating device according to claim 1, wherein the matrix forming material is formed with a multitude of gas bubbles entrained therein.

5. A gas generating device according to claim 1, wherein the carrier sheet has a thermoplastic surface to which the cover sheet is thermally bonded.

6. A gas generating device according to claim 5, wherein the thermoplastic surface is a plastic coating of polyethylene carried on a support sheet of a temperature resistant plastics film or a suitable paper, and wherein the carrier sheet is impermeable to both moisture and the preservative gas and the cover sheet is a gas permeable sheet.

7. A gas generating device according to claim 1, wherein the cover sheet is a non-woven fibrous plastic sheet.

8. A gas generating device according to claim 1, wherein the preservative gas is intended to be formed under humidity conditions of 85 to 100%.

9. A gas generating device according to claim 1, comprising a plurality of discrete zones of matrix forming material, each zone being surrounded by a peripheral area which is substantially free of the matrix forming material.

10. A method of manufacturing a preservative gas generating device according to claim 1, comprising the steps of:
    applying onto an extended carrier sheet a layer of a matrix forming plastic polymer material having a preservative gas generating compound dispersed therein, with the layer of matrix forming material being arranged in discrete zones spaced apart from each other and each of which is surrounded by an area of carrier sheet material substantially devoid of such matrix forming material;
    optionally treating the matrix forming material in order to cure it, dry it, or otherwise stabilize it;
    covering the extended sheet with a cover sheet;
    causing the cover sheet to become bonded to the carrier sheet in the said areas devoid of the matrix forming material; and
    optionally subdividing the extended carrier sheet and associated cover sheet to form in-package preservative gas generating devices comprising one or more of said discrete zones, each device having a peripheral area substantially free of the matrix on its outer edges.

11. A method according to claim 10, wherein the preservative gas generating compound forms sulfur dioxide on contact with moisture.

12. A method according to claim 10, wherein the matrix forming material is applied to the carrier sheet by an extrusion process in which a layer of the matrix forming material is extruded through at least one nozzle onto a travelling extended carrier sheet, the nozzle(s) being of a width approximately equal to the width of the said discrete zones and wherein the spacing of the nozzle(s) from the travelling carrier sheet, at least in part, determines the thickness of the layer.

13. A method according to claim 10, wherein the carrier sheet has a thermoplastic surface formed as a thermoplastic layer bonded to a support sheet; and the cover sheet is manufactured from a moisture and gas permeable material.

14. A method according to claim 13, wherein the support sheet is a temperature resistant plastics film or a suitable paper.

15. A method according to claim 10, wherein the matrix forming material is a plastisol which is cured by heating.

16. A method according to claim 10, which is carried out on a substantially continuous basis by extruding a layer of said matrix forming material in discrete zones onto a travelling extended carrier sheet which is then passed through a heating assembly in order to cure the matrix forming material, following which thermal bonding of the cover sheet to the carrier sheet is performed along longitudinal and transverse strips between the said discrete zones.

* * * * *